United States Patent
Eguchi et al.

(10) Patent No.: US 9,479,461 B2
(45) Date of Patent: *Oct. 25, 2016

(54) COMPUTER SYSTEM AND METHOD FOR COMMUNICATING DATA BETWEEN COMPUTERS

(75) Inventors: Shuhei Eguchi, Tokyo (JP); Ryo Yamagata, Tokyo (JP); Yoshiki Murakami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 56 days.

This patent is subject to a terminal disclaimer.

(21) Appl. No.: 14/360,022

(22) PCT Filed: Mar. 16, 2012

(86) PCT No.: PCT/JP2012/056932
§ 371 (c)(1),
(2), (4) Date: May 22, 2014

(87) PCT Pub. No.: WO2013/136522
PCT Pub. Date: Sep. 19, 2013

(65) Prior Publication Data
US 2014/0269754 A1 Sep. 18, 2014

(51) Int. Cl.
*H04L 12/28* (2006.01)
*H04L 12/935* (2013.01)
*G06F 13/40* (2006.01)

(52) U.S. Cl.
CPC ........... *H04L 49/30* (2013.01); *G06F 13/4022* (2013.01)

(58) Field of Classification Search
CPC ....................................................... H04L 39/30
USPC ........................... 370/400–419; 710/306–314
See application file for complete search history.

(56) References Cited

U.S. PATENT DOCUMENTS

| 2008/0117909 | A1* | 5/2008 | Johnson ............... G06F 13/387 370/392 |
| 2009/0290595 | A1* | 11/2009 | Celebioglu ........... G06F 13/385 370/419 |
| 2010/0082874 | A1 | 4/2010 | Baba et al. |
| 2010/0115174 | A1* | 5/2010 | Akyol ................... G06F 13/385 710/316 |
| 2011/0106975 | A1 | 5/2011 | Inomata |
| 2013/0254453 | A1 | 9/2013 | Sato et al. |

FOREIGN PATENT DOCUMENTS

| JP | 2008-181389 A | 8/2008 |
| JP | 2010-079816 A | 4/2010 |
| JP | 2010-273135 A | 12/2010 |
| JP | 2011-097497 A | 5/2011 |
| JP | 2011-107858 A | 6/2011 |
| JP | 5399570 B2 | 11/2013 |

* cited by examiner

*Primary Examiner* — Iqbal Zaidi
(74) *Attorney, Agent, or Firm* — Volpe and Koenig, P.C.

(57) ABSTRACT

In a computer on the transmission side, an NW driver, which is recognized, by the OS, as an NIC driver, stores data to be transmitted and a destination SPA into a memory, and outputs a transaction layer packet (TLP), which has been generated by a first computer, to a PCIe switch. A first NIC logic of the PCIe switch of the PCIe switch corresponding to the first computer on the transmission side adds a system port address (SPA) to the TLP transferred from the first computer, and transfers the data of the TLP to a port associated with a second NIC logic and having an address indicated by the SPA (destination SPA). The second NIC logic having received the data writes the receive data into a memory of a second computer, on the reception side, which is connected to another PCIe switch where the second NIC logic exists.

13 Claims, 15 Drawing Sheets

| Bus# | SPA | EVH# |
|---|---|---|
| 0 | 80 | - |
| 1 | 100 | 0 |
| 2 | 120 | - |
| ... | | ... |
| 127 | 300 | - |

| SUBA | ALCMP |
|---|---|
| 0 | 1 |
| 1 | 1 |
| 2 | 1 |
| 3 | 0 |
| 4 | 1 |
| 5 | 0 |
| 6 | 0 |
| 7 | 1 |
| 8 | 1 |
| ... | |
| 127 | |

| VLAN | SUBA | | | | | |
|---|---|---|---|---|---|---|
| | 0 | 1 | 2 | 3 | 4 | ... |
| 0 | 0 | 0 | 1 | 0 | 0 | ... |
| 1 | 0 | 0 | 0 | 0 | 1 | ... |
| 2 | 1 | 0 | 0 | 0 | 0 | ... |
| 3 | 0 | 0 | 0 | 1 | 0 | ... |
| 4 | 0 | 0 | 0 | 0 | 0 | ... |
| ... | ... | ... | ... | ... | ... | |

| NUA | Port# | | | | | |
|---|---|---|---|---|---|---|
| | 0 | 1 | 2 | 3 | 4 | ... |
| 100 | 1 | 1 | 0 | 1 | 1 | |
| 200 | 0 | 1 | 1 | 0 | 1 | |
| 300 | 1 | 1 | 0 | 0 | 1 | |
| ... | | | | | | |

304

COMPUTER SYSTEM AND METHOD FOR COMMUNICATING DATA BETWEEN COMPUTERS

TECHNICAL FIELD

The present invention relates to a computer system and method for communicating data between computers, and more particularly, to data communication between servers connected by use of switches based on the PCI Express standard (that is hereinafter referred to as PCIe switches).

BACKGROUND ART

Ethernet (registered trademark) is mainly used as a communication method between servers in a data center. In general, the amount of data communicated between servers in a data center is large, and there is a problem of increasing the cost of the installation of facilities such as network switches, cables, and Ethernet cards for communication via Ethernet.

Further, a PCIe switch is used as a communication tool between a high-speed server and a device connected to the server. For example, Patent Literature 1 discloses a computer system where multiple computers and multiple input/output devices are connected by a PCIe switch. Patent Literature 2 discloses a technology for sharing an I/O device by allocating multiple virtual functions (VF) of a PCI device to multiple blades by use of a PCIe switch. Further, Patent Literature 3 discloses a technology for detecting a path error in a communication system where servers are connected by a layer 2 switch.

CITATION LIST

Patent Literature

PTL 1: Japanese Unexamined Patent Application Publication No. 2011-107858
PTL 2: Japanese Unexamined Patent Application Publication No. 2010-79816
PTL 3: Japanese Unexamined Patent Application Publication No. 2010-273135

SUMMARY OF INVENTION

Technical Problem

The PCIe switch is a common technology for connecting a server and a device connected to a slot in a chassis. Recently, there has been proposed communication between servers by use of the PCIe switch. However, the software for the communication between servers running on the server is developed with the assumption that the communication between servers is performed via Ethernet. Thus, there is a problem that the existing software for server communication may not be used if Ethernet is simply replaced by the PCIe switch.

An objective of the present invention is to achieve data communication between computers by use of a PCIe switch without using any conventionally used network device of Ethernet.

Solution to Problem

Preferably, the present invention is a computer system including multiple computers for executing programs under an OS, and a switch (referred to as a PCIe switch) based on the PCI Express, which is connected to each of the computers. The computer system communicates packets between the computers through the PCIe switches. The PCIe switch includes an external port to which the computer is connected, an internal port to which another PCIe switch is connected, and a network interface card (NIC) logic to be recognized as an endpoint by the computer. A unique system port address (SPA) associated with the destination bus number is allocated to the external port and the NIC logic. A first computer on the transmission side includes an NW driver to be recognized as a driver of a network interface card (NIC) by the OS. The NW driver stores data to be transmitted and the destination SPA into a memory. At the same time, the NW driver outputs a transaction layer packet (TLP) generated by the first computer to the PCIe switch. In the PCIe switch, a first NIC logic adds the SPA to the TLP transferred from the first computer, and transfers data read from the memory to another NIC logic (second NIC logic) having the destination (destination SPA) indicated by the SPA. The second NIC logic receives the data, and writes the received data into the memory of a second computer on the reception side that is connected to the other PCIe switch where the second NIC logic exists.

Further, preferably, the present invention is a computer system including multiple computers that may have a virtual computer, to execute programs under an OS, and a switch (referred to as a PCIe switch) based on the PCI Express standard, which is connected to each of the multiple computers through a PCIe link. The PCIe switches are connected to each other through the PCIe link. The computer system communicates packets between the computers through the PCIe switches. A port of the PCIe switch connected to the computer includes a conversion table where an endpoint VH (EVH), which is a number allocated, without duplication, to a computer with which one NIC logic communicates, can be subtracted from the destination bus number. The EVH obtained by referring to the conversion table is added to a transaction layer packet (TLP) that is input to the PCIe switch from the computer. Each of the PCIe switches includes an NIC logic to be recognized as an endpoint by the computer. A memory of the computer includes an NW driver to be recognized as a driver of the NIC by the OS. The NW driver writes transmission data and a destination SPA into the memory. A first NIC logic corresponding to a first computer on the transmission side reads the data and the destination SPA that are written in the memory by the NW driver. The first NIC logic transmits the data read from the memory to another NIC logic (second NIC logic) having the destination SPA. The second NIC logic receives the data and writes the received data into a memory of a second computer on the reception side, which is connected to the PCIe switch where the second NIC logic exists.

Further, the present invention is a method for communicating data between computers that is performed in the computer system described above.

Advantageous Effects of Invention

According to the present invention, it is possible to achieve communication between severs by use of PCIe switches. Thus, the need for the use of network devices of Ethernet in the conventional computer system where servers are connected via Ethernet can be eliminated. Further, when the communication between servers is achieved by use of PCIe switches, data communication is possible between servers by the existing software for the communication between servers using Ethernet.

BRIEF DESCRIPTION OF DRAWINGS

FIG. 14 is a view of the structure of a sub address allocation map according to Example 2.

FIG. 16 is a view of the structure of a VLAN map according to Example 2.

FIG. 17 is a view of the structure of a broadcast routing table according to Example 2.

DESCRIPTION OF EMBODIMENTS

Hereinafter, examples of the present invention will be described with reference to the accompanying drawings.

EXAMPLE 1

Figure 1:
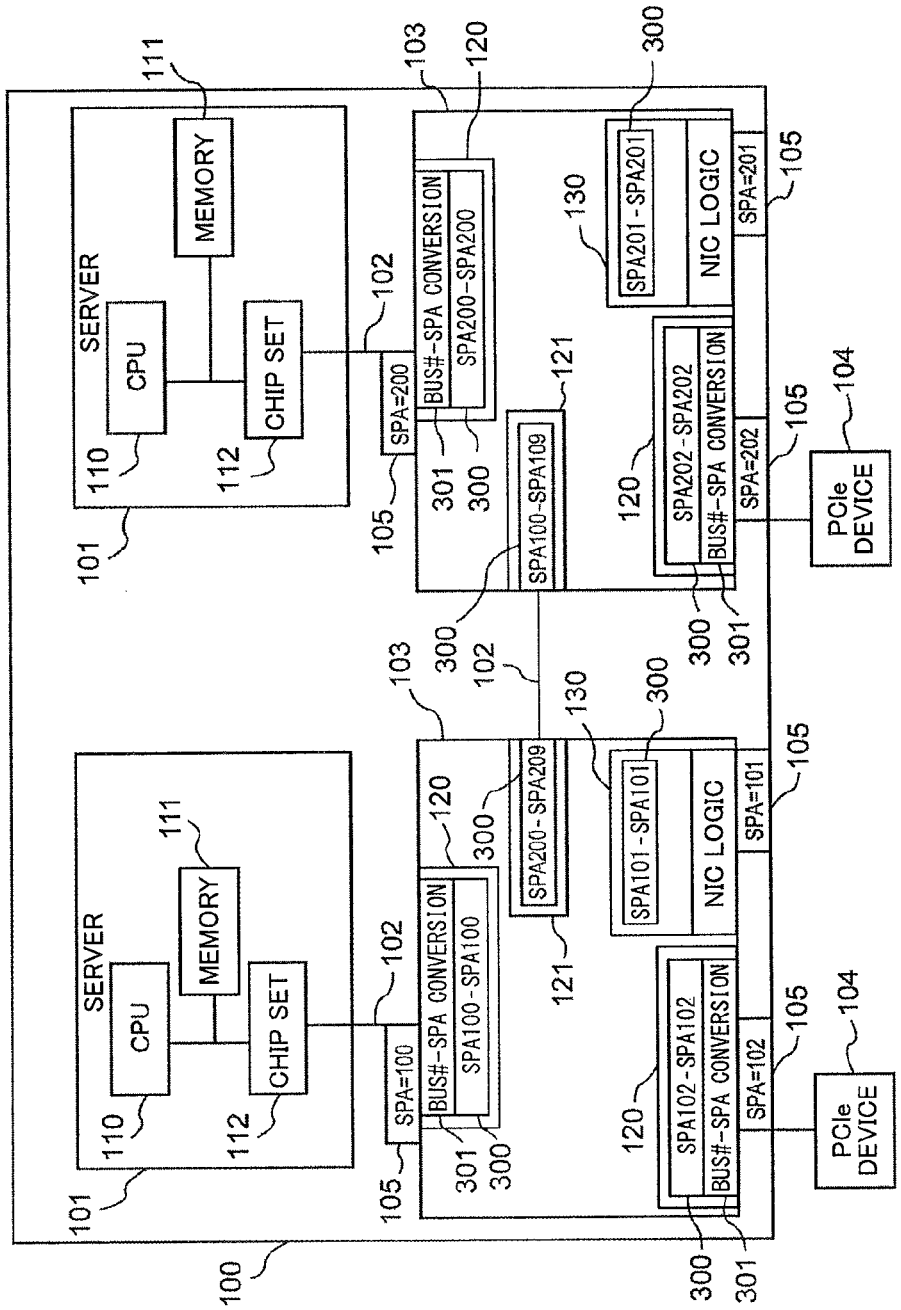
FIG. 1 is an overall block diagram of a computer system according to an example (Example 1).

FIG. 1 is an overall block diagram of a computer system according to an example of the present invention. A computer system 100 includes: multiple servers 101 each including a CPU 110, a memory 111, and a chip set 112 to execute programs under an OS (operating system); multiple switches (PCIe switches) 103 based on the PCIe standard, which are connected to each of the servers 101 through a PCIe link 102; and an I/O device (hereinafter, referred to as a PCIe device) 104 based on the PCIe standard, which is connected to the PCIe switch 103.

The PCIe switch 103 includes a port for connecting the server, the PCIe device, and another PCIe switch. The port has two types: a port 120 (which is referred to as an external port) connected to the server 101 and the PCIe device 104 through the PCIe link; and a port 121 (which is referred to as an internal port) connected to another PCIe switch through the PCIe link. A system port address (SPA) 105 is allocated to the external port 120. The SPA is the unique identification information (for example, numbers) statistically allocated to all external ports in the system. Further, the external port 120 has a Bus#-SPA conversion table 301. The SPA is not allocated to the internal port which does not have a Bus#-SPA conversion table.

The PCIe switch 103 includes an NIC logic (network interface card) 130 to be recognized as an endpoint by the server, which can transmit and receive TLP with the server 101. Similarly to the external port 120, the SPA 105 is allocated to the NIC logic 130, which is stored in a range resister 300 that indicates the range of SPA. Here, the reason why it is referred to as NIC logic is that this logic makes the servers 101 behave as if an Ethernet network existed by using the PCIe network to achieve communication between servers. In other words, the logic is to achieve the Ethernet network. Note that in terms of the functional aspects, it may also be referred to as PCIe switch NIC logic.

The range register 300 can show the range of SPA by storing two SPAs. The range of SPA set in the range register is the destination SPA of a TLP (transaction layer packet) that can pass through the external port 120 from the inside of the PCIe switch to the outside. Note that the TLP can pass through from the outside of the switch to the inside regardless of the setting of the range register. The range of SPA allocated to the port, which is included in a subset of the topology of the PCIe connected to the port, is set to the range register 300.

The SPA corresponding to the destination bus number is registered in the Bus#-SPA conversion table 301. Both the external port 120 and the internal port 121 have the range register 300 indicating the range of the SPA. The range of the SPA is set to the range register 300 so that the SPA of the external port existing beyond the bus connected to the port is included.

In the initial setting of the SPA 105, the range register 300, and the Bus#-SPA conversion table 301, their contents are generated by a management system (not shown) such as a management terminal connected to the computer system 100, based on the setting information the management system has from the beginning. For example, several types of setting information can be prepared according to the topology so as to select which information should be used from the setting information types. Further, it is also possible that the management system automatically detects the topology periodically to automatically generate the conversion table and SPA setting information. The present invention is not limited to any of the above methods.

The destination SPA is added to the TLP as a label. In the network of the PCIe switches 103, the routing is performed by using the SPA 105 instead of the destination bus number. More specifically, the routing is performed by repeating the transfer of the SPA added to the TLP as the label to the port within the range of the SPA set in the range register. The SPA label is removed when the TLP is output from the external port.

Here, a software whose I/F between the OS (Operating System) (not shown) of the server 101 and the driver is adapted to the NIC driver, and that is recognized as an NIC driver by the OS (hereinafter referred to as an NW (Net Work) driver 513) is prepared in the memory 111 (see FIG. 3). By using the NW driver 513 (namely, the function realized by executing the software by the CPU 110), the server 101 can communicate with the NIC logic 130, thus allowing communication between servers. In this way, the software developed with the assumption that the conventional Ethernet is present can be used without any change.

Figure 2:
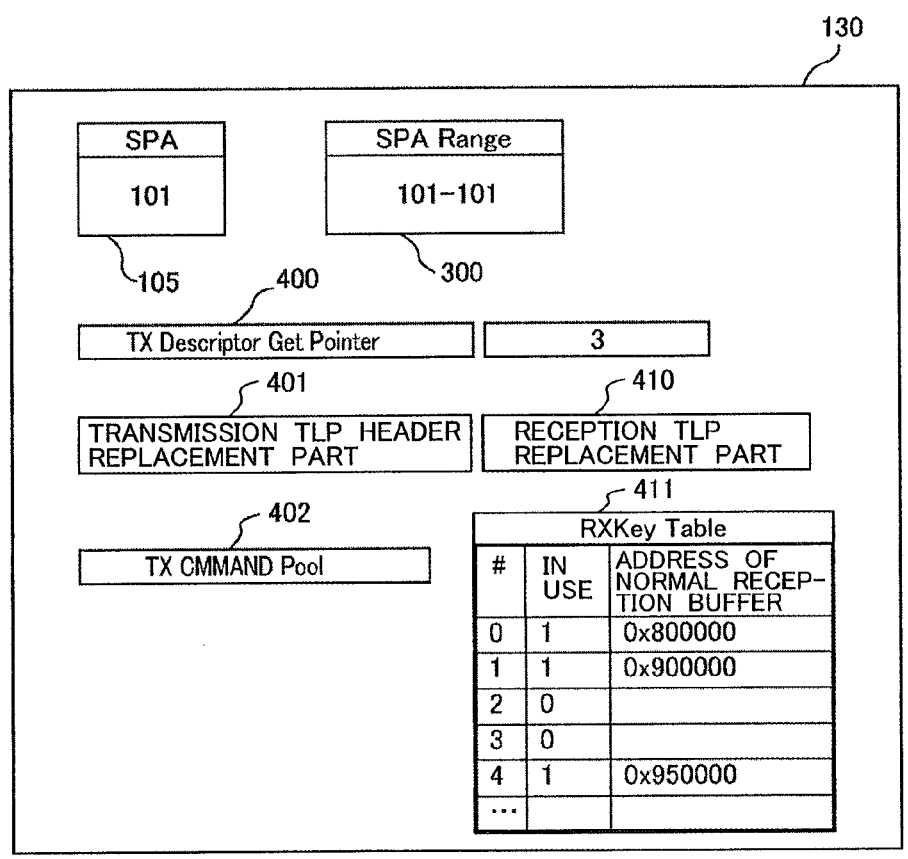
FIG. 2 is a view of the details of an NIC logic 130 according to Example 1.

FIG. 2 shows the details of the NIC logic. The NIC logic 130 transmits and receives data by dividing the Ethernet network packet into data of TLP which is the transfer unit of PCIe. The TLP can be transmitted and received between the NIC logics in different PCIe switches or between the NIC logic and the server 101.

The NIC logic 130 has the range register 300, to which the SPA 105 is allocated similar to the external port 120. Further, the NIC logic 130 includes a TX descriptor get pointer 400, a transmission TLP header replacement part 401, a TX command pool 402, a reception TLP header replacement part 410, and an RX key table 411.

The TX descriptor get pointer 400 indicates which value of the TX descriptor (described below) present on the memory 111 of the server 101 is to be transferred next. The transmission TLP header replacement part 401 is the part for replacing the header of the TLP including the data of the network packet received from the server 101, in order to transfer the data to the NIC logic present in another PCIe switch. The TX command Pool 402 temporarily the TX descriptor transmitted from the server in the NIC logic 130. The reception TLP header replacement part 410 is the part for replacing the header of the TLP received from the other NIC logic with the header addressed to the destination server. The RX key table 411 is a list of addresses on the memory of normal reception buffers (described below) on the memory of the server, indicating whether each normal reception buffer is in use or not.

Figure 3:
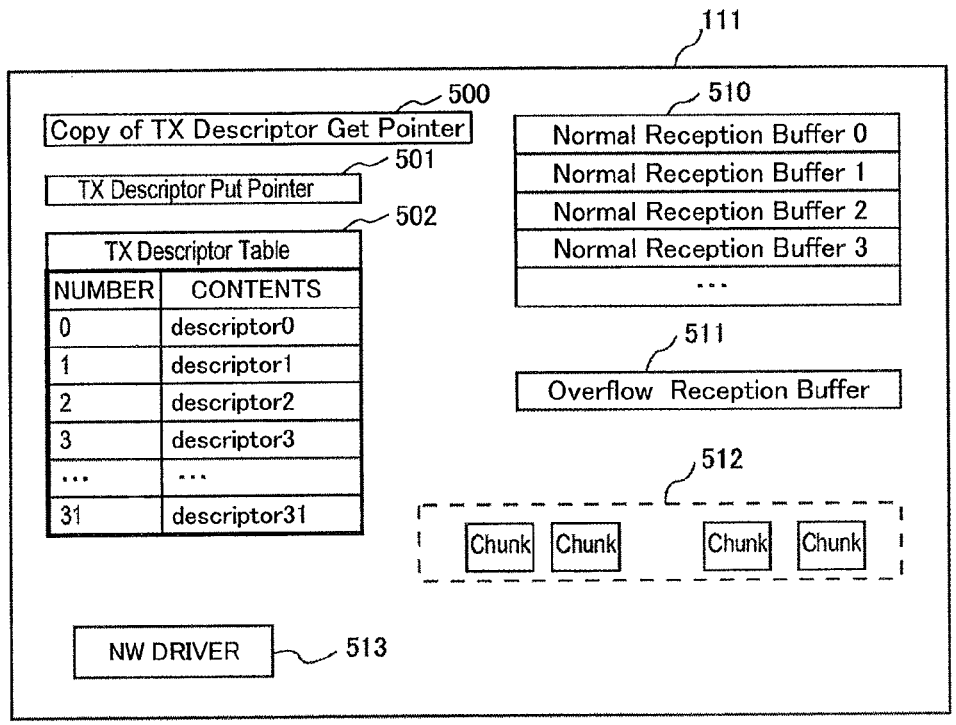
FIG. 3 is a view of a data structure of a memory of a server according to Example 1.

FIG. 3 shows the data structure in the memory of the server involved in network packet communication. The memory 111 of the server 103 includes a copy 500 of the TX descriptor get pointer 400, TX descriptor put pointer 501, TX descriptor table 502, normal reception buffer 510, overflow reception buffer 511, and chunk 512.

The TX descriptor table 502 is a table for storing information of network packets to be transmitted, in which one entry is used for each network packet. Each entry is referred to as a TX descriptor. The copy 500 of the TX descriptor get pointer indicates which value of the TX descriptor is to be transferred next to the NCI logic 130. When a request for transmitting the next network packet is made, the TX descriptor put pointer 501 indicates where the information of the particular network packet should be recorded in the TX descriptor table 502. The TX descriptor table 502 has a ring-like shape. When the end of the TX descriptor table 502 is pointed, the TX descriptor get pointer 400 and the TX descriptor put pointer 501 will then return to the beginning.

When the TLP including the network packet information is received from the NIC logic 130, the normal reception buffer 510 temporarily stores the received information. Multiple normal reception buffers 501 exist with the assumption that multiple network packet information items arrive. The overflow reception buffer 511 is prepared for a case where received data is stored in all the normal reception buffers 510 and the normal reception buffers 510 would overflow. Unlike the normal reception buffer 510, the overflow reception buffer 511 may store information of different network packets at the same time. The information of one network packet is separately present on the memory. Each division unit is referred to as a chunk 512.

Figure 4:
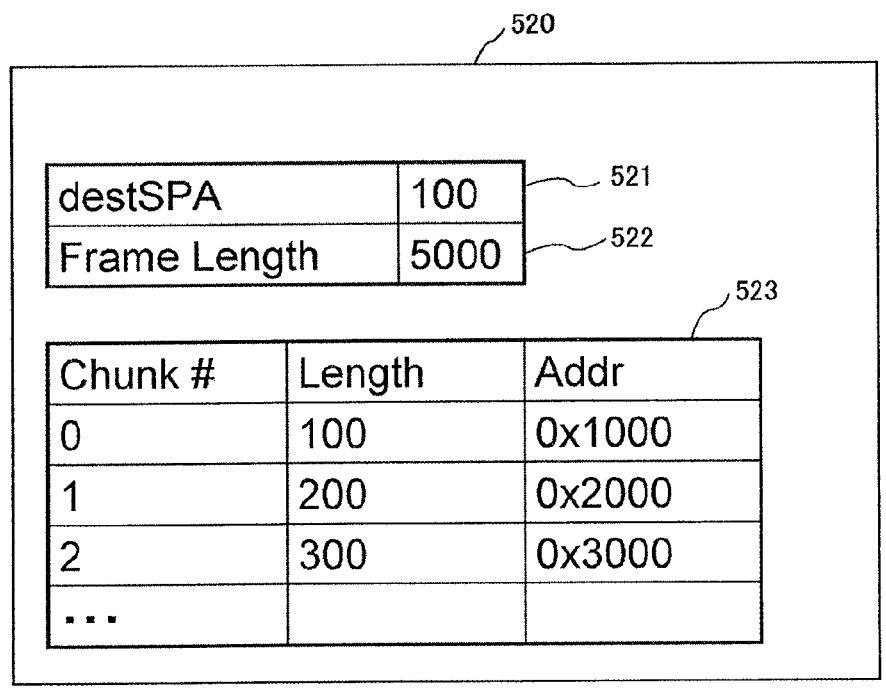
FIG. 4 is a view showing a detailed configuration of a TX descriptor according to Example 1.

FIG. 4 shows the detailed configuration of the TX descriptor. The TX descriptor table 502 includes the following information: a dest SPA 521 indicating the destination of the network packet, a frame length 522 indicating the frame length of the network packet, and a list 523 of the chunk length and address for each chunk. The frame length 522 indicates the total value of all the chunk lengths. These information items are stored in the TX descriptor when the NW driver 513 receives a network packet transfer request from the CPU 110.

Next, the network packets transmission/reception operation between the servers 101 in the computer system 100 will be described with reference to FIGS. 5 to 8. Hereinafter, the transmission/reception process operation according to the present example will be described in terms of four aspects respectively: the process of a network packet in the transmission-side server (mainly, by the NW driver); the process in the NIC logic 130 within the transmission-side PCIe switch; the process in the NIC logic 130 within the reception-side PCIe switch; and the process in the reception-side server (mainly, by the NW driver).

<Process of the Transmission-Side Server>

Figure 5:
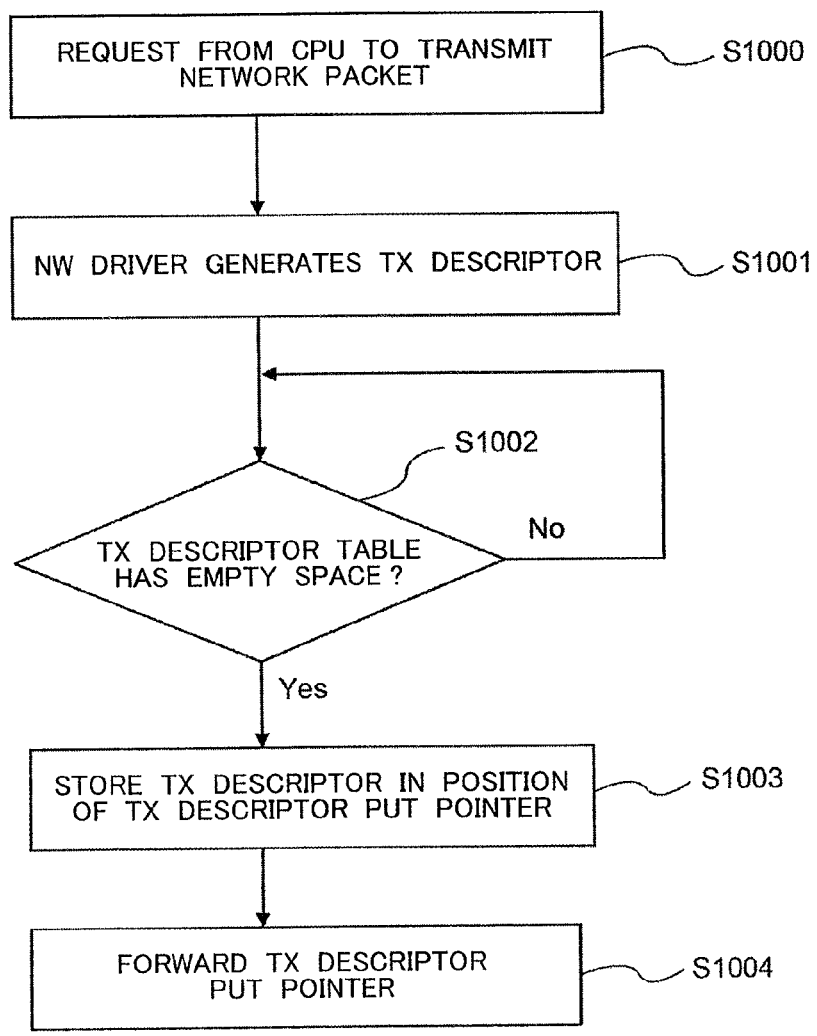
FIG. 5 is a flow chart of the operation of transmitting a network packet in a transmission-side server according to Example 1.

FIG. 5 shows the transmission process of a network packet in the transmission-side server. The CPU 110 of the transmission-side server requests the NW driver 513 to transmit a network packet (S1000). Then, the NW driver 513 generates information of the TX descriptor, namely, the destination (dest) SPA, the frame length, the chunk length, and the address (S1001).

Next, the NW driver 513 checks if the TX descriptor table 502 has an empty space (S1002). In this step, the NW driver 513 compares the TX descriptor put pointer 501 to the copy 500 of the TX descriptor get pointer, and as a result, if the TX descriptor put pointer 501 is not the same as the value (which is, for example, (the copy 500 of the TX descriptor get pointer)−1), the NW driver 513 determines that the TX descriptor table 502 has an empty space. If the TX descriptor table 502 does not have any empty space, the NW driver 513 waits until there is an empty space. If the TX descriptor table 502 has an empty space, the NW driver 513 proceeds to S1003.

In S1003, the NW driver 513 stores the TX descriptor in the position of the TX descriptor table that corresponds to the address indicated by the TX descriptor put pointer 501 (S1003). Then, the NW driver 513 increments the TX descriptor put pointer by one (S1004).

<Process of the NIC Logic within the Transmission-Side PCIe Switch>

Figure 6:
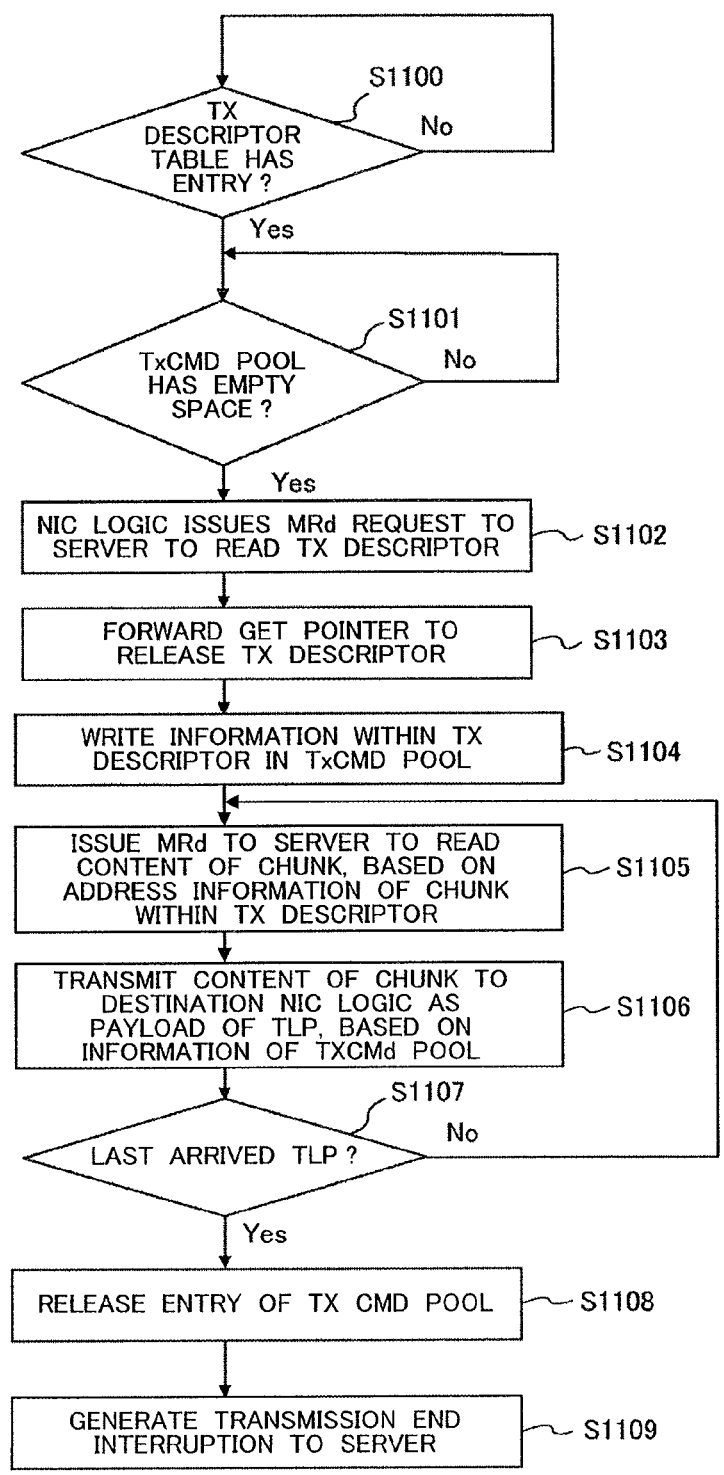
FIG. 6 is a flow chart of the process of the NIC logic in a transmission-side PCIe switch according to Example 1.

FIG. 6 shows the process of the NIC logic 130 within the transmission-side PCIe switch.

First, the NIC logic 130 checks if the TX descriptor table 502 has an entry (S1100). If the TX descriptor table 502 does not have any entry, the NIC logic 130 repeats the process of S1100. On the other hand, if the TX descriptor table 502 has an entry, the NIC logic 130 proceeds to S1101 (S1100).

In S1101, the NIC logic 130 checks if the TX command pool 402 has an empty space (namely, the NIC logic 130 checks if there is an empty space where the TX descriptor transferred from the server should be temporarily stored). As a result of the check, if there is no empty space, the NIC logic 130 repeats the process of S1101 until an empty space occurs. Then, as a result of the check, if there is an empty space, the NIC logic 130 proceeds to S1102. In S1102, the NIC logic 130 issues a memory read (MRd) request to the server 101, obtains the address of the TX descriptor by the calculation from the TX descriptor get pointer 400, and reads the TX descriptor with a memory read at the calculated address. When MRd request completion is returned to the NIC logic and the read operation is completed, the NIC logic 130 proceeds to S1103.

In S1103, the NIC logic 130 increments the TX descriptor get pointer 400 by one to release the entry of the TX descriptor table 502 from which the TX descriptor was read. Then, the NIC logic 130 writes the read TX descriptor into the TX command pool 402 (S1104). The address and length of each chunk are recorded in the read TX descriptor, and based on this information the NIC logic 130 issues an MRd request to the server to read the chunk (S1105).

The read chunk is transmitted to the NIC logic of the PCIe switch of the reception-side server (S1106). The data of the read chunk is returned from the server in the form of a completion TLP. Then, the transmission TLP header replacement part 401 replaces the header of the received TLP with the TLP header addressed to the reception-side TLP. The information of the SPA of the NIC logic of the reception-side server is recorded in the TX descriptor, so that the TLP is transmitted to the particular SPA (dest SPA 521).

Then, the NIC logic 130 determines whether it is the last TLP (S1107). In this step, the NIC logic 130 compares the accumulated length of all chunks for which read requests (MRD requests) has been made, to the frame length 522 included in the TLP descriptor. If the two lengths are the same, the NIC logic 130 determines that the reading of all chunks is completed and proceeds to S1108. On the other hand, if the two lengths are not the same, the NIC logic 130 determines that the chunks are not all read and returns to S1105.

In S1108, the reading of the chunk is completed and the information of the TX descriptor will not be necessary, so that the NIC logic 130 releases the entry of the TX command pool 402 (S1108). Then, the NIC 130 generates a transmission end interruption to notify the transmission-side server of the end of the network packet transmission (S1109).

<Process of the NIC Logic within the Reception-Side PCIe Switch>

Figure 7:
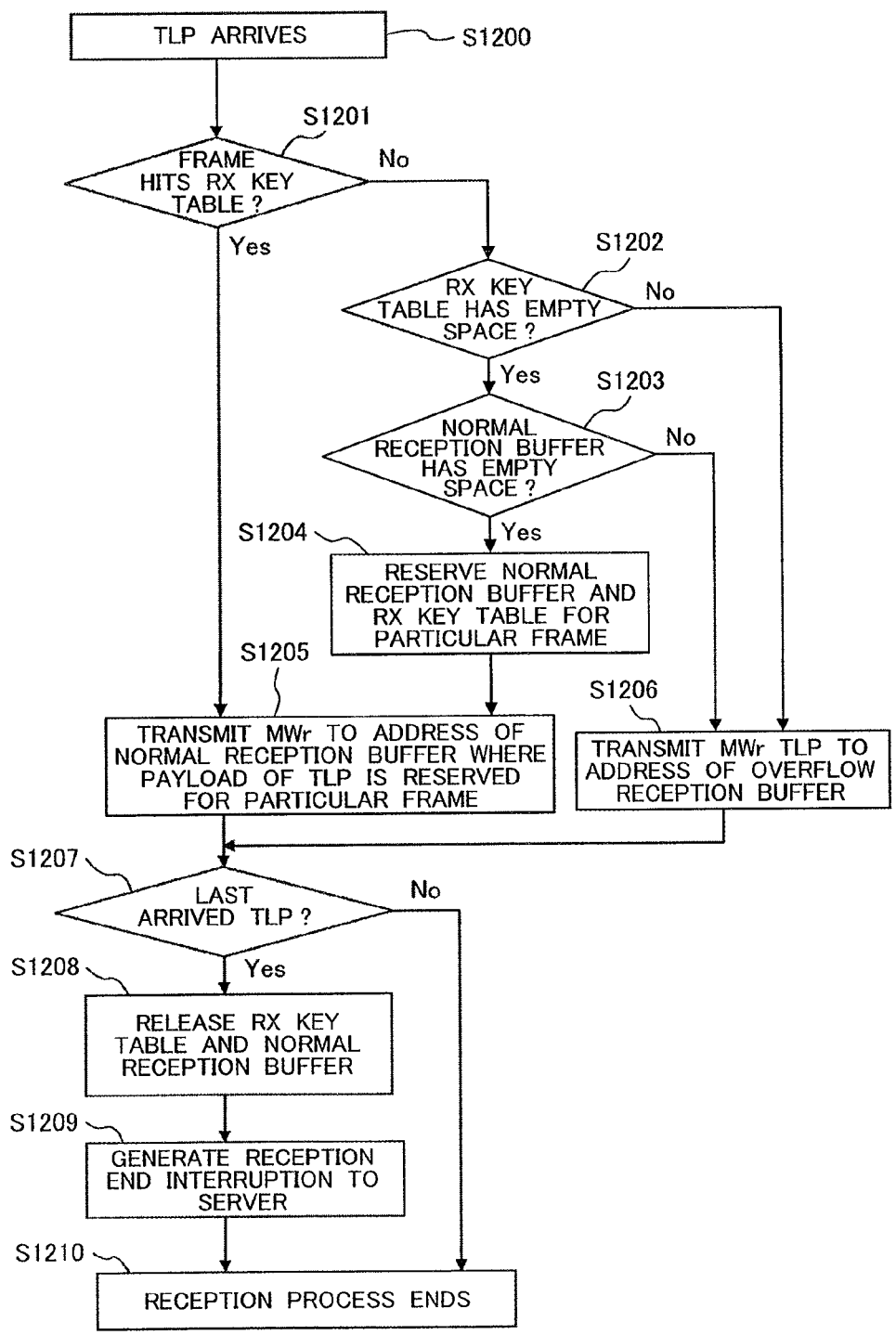
FIG. 7 is a flow chart of the process of the NIC logic of a reception-side PCIe switch according to Example 1.

FIG. 7 shows the process of the NIC logic on the reception side. When the TLP of the chunk data arrives at the NIC logic 130 of the PCIe switch 103 connected to the reception-side server 101 (S1200), the NIC logic 130 checks if the frame to which the received chunk belongs hits the RX key table 411 (S1201). Hitting the RX key table 411 means that the normal reception buffer is reserved for the particular frame in the memory 111 of the server 101. As a result of the check, if the frame hits the RX key table 411, the NIC logic 130 proceeds to S1205. On the other hand, if the frame does not fit the RX key table 411, the NIC logic 130 proceeds to S1202.

In S1202, the NIC logic 130 checks if the RX key table 411 has an empty space. As a result of the check, if there is no empty space, the NIC logic 130 proceeds to 1206. In other words, if the normal reception buffer or the RX key table 411 is not reserved for the received frame, the reception TLP header replacement part 410 replaces the data of the received chunk with the memory write (MWr) request addressed to the address of the overflow reception buffer, and transmits the TLP of the memory write request (S1206).

On the other hand, as a result of the check in S1202, if there is an empty space, the NIC logic 130 proceeds to S1203 to check the presence of the normal reception buffer 510 that can be used (S1203). As a result of the check, if the normal reception buffer that can be used is present, the NIC logic 130 performs the process of S1206. On the other hand, if the normal reception buffer that can be used is not present, the NIC logic 130 proceeds to S1204. In other words, since it has been checked that there is an empty space in the RX key table 411 and the normal reception buffer 510, the NIC logic 130 reserves the normal reception buffer and the RX key table for the received frame to write the information necessary for the reserved RX key table (S1204).

In S1205, the reception TLP header replacement part 410 replaces the data of the received chunk with the MWr request addressed to the address of the normal reception buffer, and transmits the TLP of the MWr request (S1205). The information of the normal reception buffer reserved for the particular frame to transmit the TLP is written in the RX key table 411.

Then, the NIC logic 130 checks if the received TLP is the last chunk (S1207). The chunks that the reception-side NIC logic receives do not necessarily arrive in the order of address. Thus, whether all chunks have been received is determined by checking if the accumulation of the length of received chunks is the same as the frame length. As a result of this determination, if the received TLP is not the last chunk, the NIC logic 130 proceeds to S1210 and ends the reception process.

On the other hand, if the received TLP is the last chunk, the NIC logic 130 proceeds to S1208. In other words, since all the chunks belonging to the particular frame have been received, the NIC logic 130 releases the RX key table 411 and the normal reception buffer 510 that are reserved for the particular frame (S1208). Then, the NIC logic 130 generates an interruption to notify the server that the reception of chunks has been completed (S1209), and ends the reception process (S1210). When the reception process of the particular TLP is ended, the NIC logic 130 waits until the next TLP arrives.

<Process of the Reception-Side Server>

Figure 8:
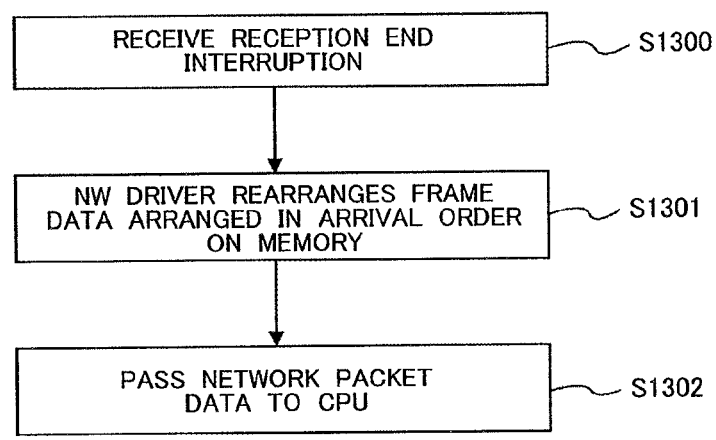
FIG. 8 is a flow chart of the process of receiving a network packet in a reception server according to Example 1.

FIG. 8 shows the reception process in the reception-side server.

When the interruption from the NIC logic 130 of the reception-side server is received (S1300), all the data of the frame has already arrived at the reception buffer 510. The received data is arranged in the order of arrival time on the memory 111. Thus, the NW driver rearranges the data on the reception buffer in the order of address to restore the network packet (S1301). After rearranging the data, the NW driver passes the network packet to the CPU 110 (S1302). The above is the procedure for transferring the network packet from the transmission-side server to the reception-side server.

EXAMPLE 2

The present example shows an example where multiple servers are connected to a single PCIe switch with multiple VLANs (Virtual LANs) present in a computer system.

Figure 9:
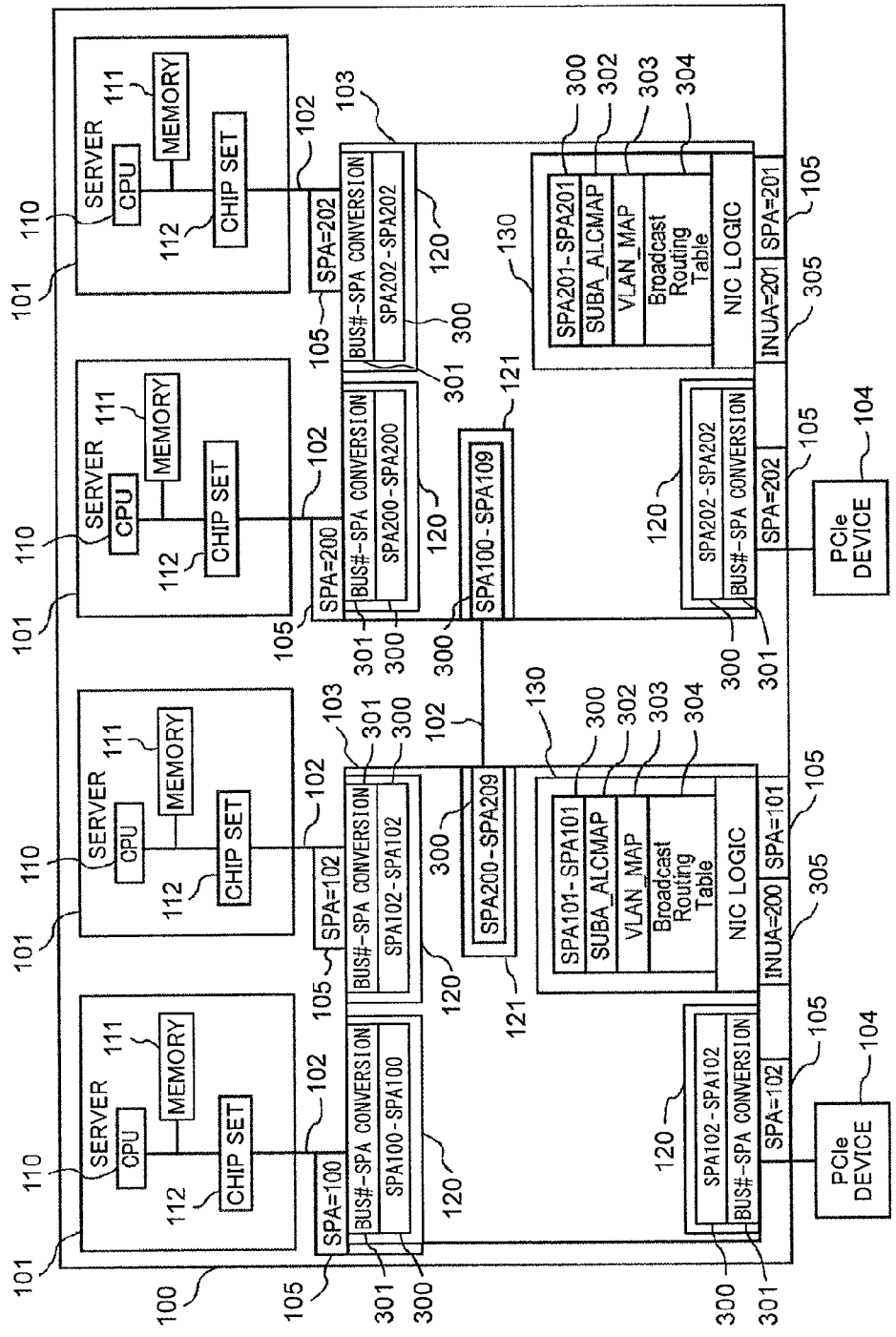
FIG. 9 is an overall block diagram of a computer system according to Example 2.

FIG. 9 is an overall block diagram of a computer system. In a computer system 100 shown in FIG. 9, the same reference numerals as those shown in FIG. 1 of Example 1 have the same components and functions. The description of these components will be omitted to avoid redundancy. In FIG. 9, the difference from the configuration in FIG. 1 is that multiple servers 101 are connected to a single PCIe switch 103, and that the NIC logic 130 includes a SUB_ALCMAP (Sub Address Allocation Map) 302, a VLAN_MAP 303, a broadcast routing table 304, and an INUA 305. The NUA is a unique number in the system that is allocated to each NIC logic to identify each NIC logic from others. In addition, the field of the Bus#-SPA conversion table 301 is extended.

Figure 10:
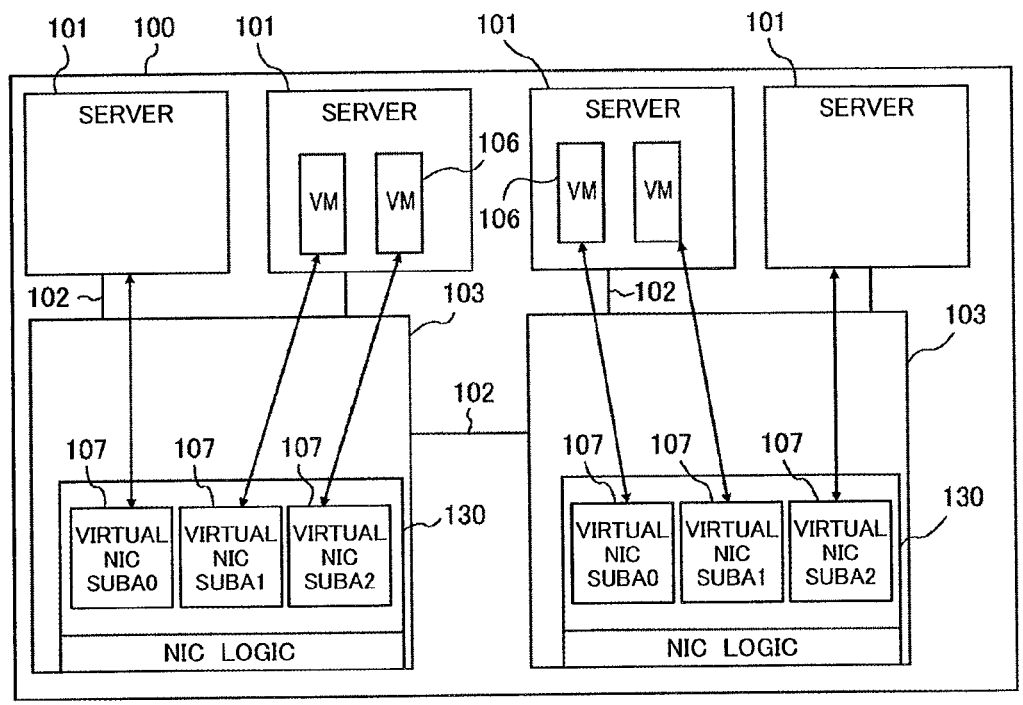
FIG. 10 is a schematic block diagram of the computer system to illustrate Example 2.

FIG. 10 is a schematic block diagram of the computer system to illustrate the present example. When multiple servers 101 are connected to a single PCIe switch 103 and multiple virtual machines (VMs) are present in each server, the NIC logic 130 must pretend as if one virtual NIC virtually exists for each server and each virtual machine, although only one NIC logic 130 exists in the PCIe switch 103. This false NIC is referred to as a virtual NIC 107. In FIG. 9, the additional components of the NIC logic are necessary to achieve virtual NIC. Further, numbers starting from 0 uniquely assigned to each virtual NIC in each of the NIC logics are referred to as sub addresses (SUBA).

Figure 11:
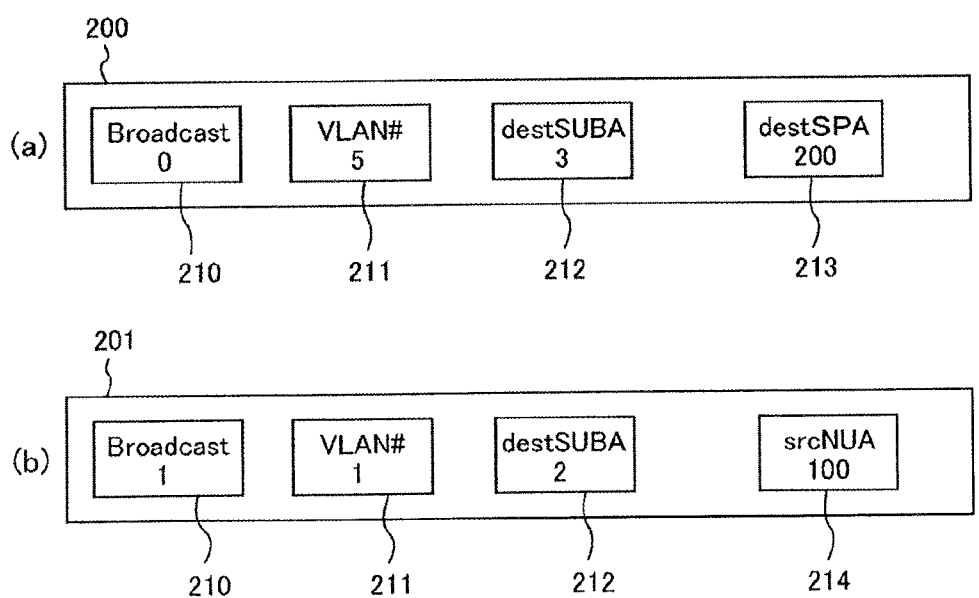
FIG. 11 is views of an example of a TLP that is transmitted and received between NIC logics according to Example 2.

FIG. 11 shows a TLP for unicast and a TLP for broadcast, respectively, which are transmitted and received between NIC logics. (a) shows a unicast TLP 200 and (b) shows a broadcast TLP 201. Reference numeral 210 denotes a broadcast bit, where "1" is recorded for the broadcast TLP and "0" is recorded for the unicast TLP. In a VLAN# field 211, VLAN# to which the server outputting the TLP belongs is described. In a destSUBA field 212, a SUBA corresponding to the server which is the destination of the TLP is recorded. In a destSPA field 213, the SPA of the NIC logic which is the destination of the unicast TLP is recorded. In a srcNUA field, the NUA of the NIC logic which is the output source of the broadcast TLP is recorded. In the case of the broadcast TLP, the destSPA field is not necessary because the TLP is delivered to all the SUBAs that belong to the same VLAN.

Figures 12, 13:
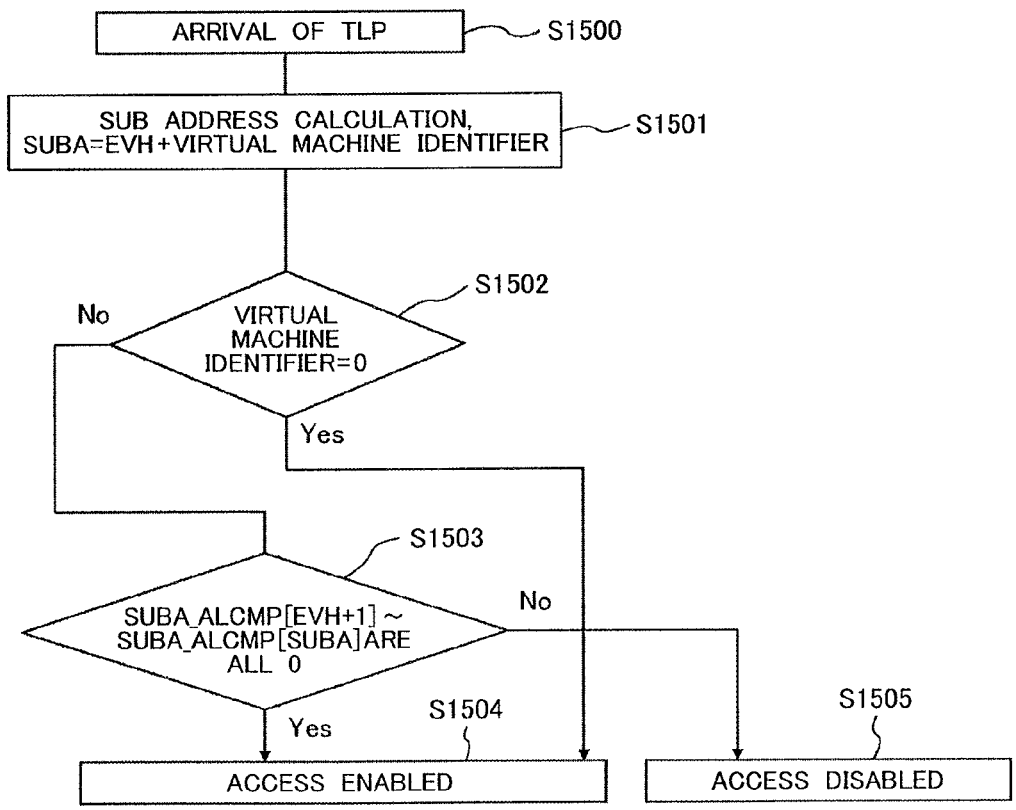
FIG. 12 is a view of an example of the structure of a Bus#-SPA conversion table according to Example 2.
FIG. 13 is a flow chart of the process when the NIC logic checks the access right according to Example 2.

FIG. 12 shows an example of the structure of the Bus#-SPA conversion table 301 according to the present example. When multiple servers are connected to a single PCIe switch or when multiple virtual machines are running on a certain server, one NIC must virtually exist for each of the servers and virtual machines. Further, in the case where multiple VLAN exist or a broadcast packet is transferred, the broadcast packet should be transferred only to the server belonging to the same VLAN, and the broadcast packet should not be transferred to the server belonging to a different VLAN.

Thus, it is necessary to provide, on the NIC logic side, means for identifying the server or virtual machine from which the receive TLP is transmitted. Thus, the Bus#-SPA conversion table 301 is extended to provide an endpoint virtual hierarchy (EVH) field 312, in addition to the BUS# field 310 and the SPA field 311 that are already present in the Bus#-SPA conversion table 301. The EVH 312 is the number uniquely assigned to each of the servers with which one NIC logic communicates. However, the same number may be assigned to servers that communicate with different NIC logics.

When the TLP is input to the external port from the server, the EVH is added together with the SPA. The value of the EVH field is determined in advance so that the EVH to be added matches the SUBA of the virtual NIC used by the server. When the TLP arrives at the NIC logic, the NIC logic checks the EVH to identify the server from which the TLP is output.

Although the identification of servers is possible by means of the EVH 312, the identification of multiple virtual machines running on the server may not be possible. It is because the virtual machine from which the TLP is output may not be identified by the external port where the EVH is added to the input TLP. It is possible to use BDF#, which is the field existing in the TLP from the beginning, in order to distinguish the virtual machine from others. A part of the BDF# is not actually used for the routing. A portion of this part is used to identify each of the virtual machines. This part is referred to as a virtual machine identifier.

It is assumed that the virtual machine identifier is used for the initial setting starting from 0. If (virtual machine EVH+ virtual machine identifier) is allocated to match the SUBA that is allocated to each virtual machine of each server, it is possible to identify the server or virtual machine from which the TLP is output when the NIC logic receives the particular TLP. (Hereinafter, the value of ALCMAP with the field of SUBA written in the position X is referred to as SUBA_ALCAMP[X]).

When the server outputs a TLP having an invalid virtual machine identifier due to a bug or malicious user, the NIC logic may misidentify the server as the source of the TLP. Note that the EVH is added on the switch side and not on the server side, so that there is no chance the server will pretend. The SUB_ALCMAP (Sub Address Allocation Map) 302 (see FIG. 14) is necessary to prevent the NIC logic from misidentifying the server as the source.

Figure 14:
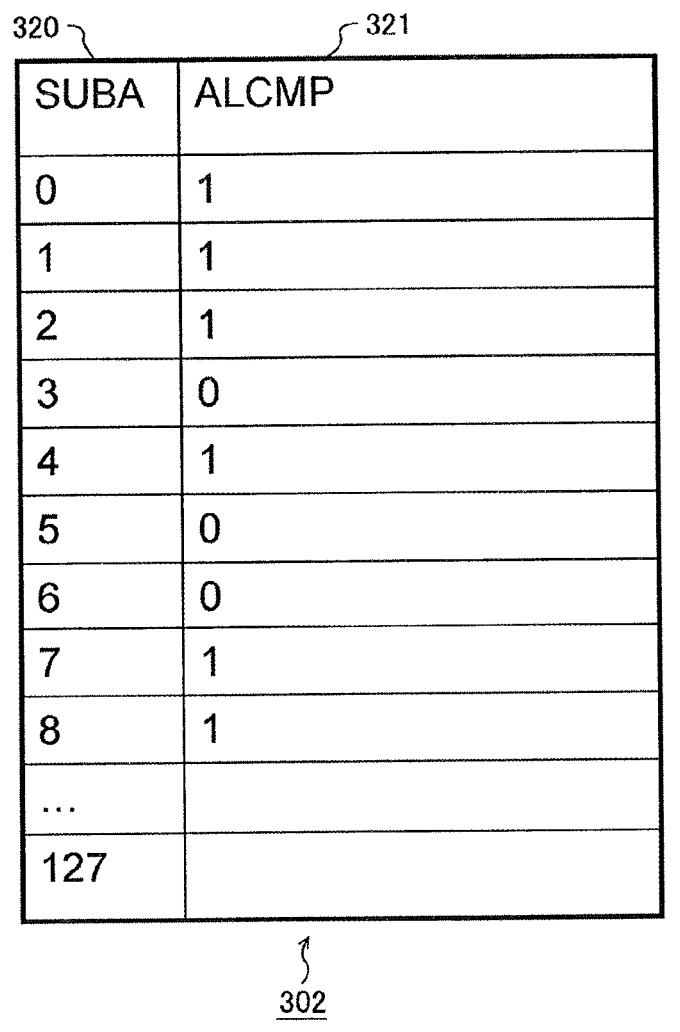
Figure 15:
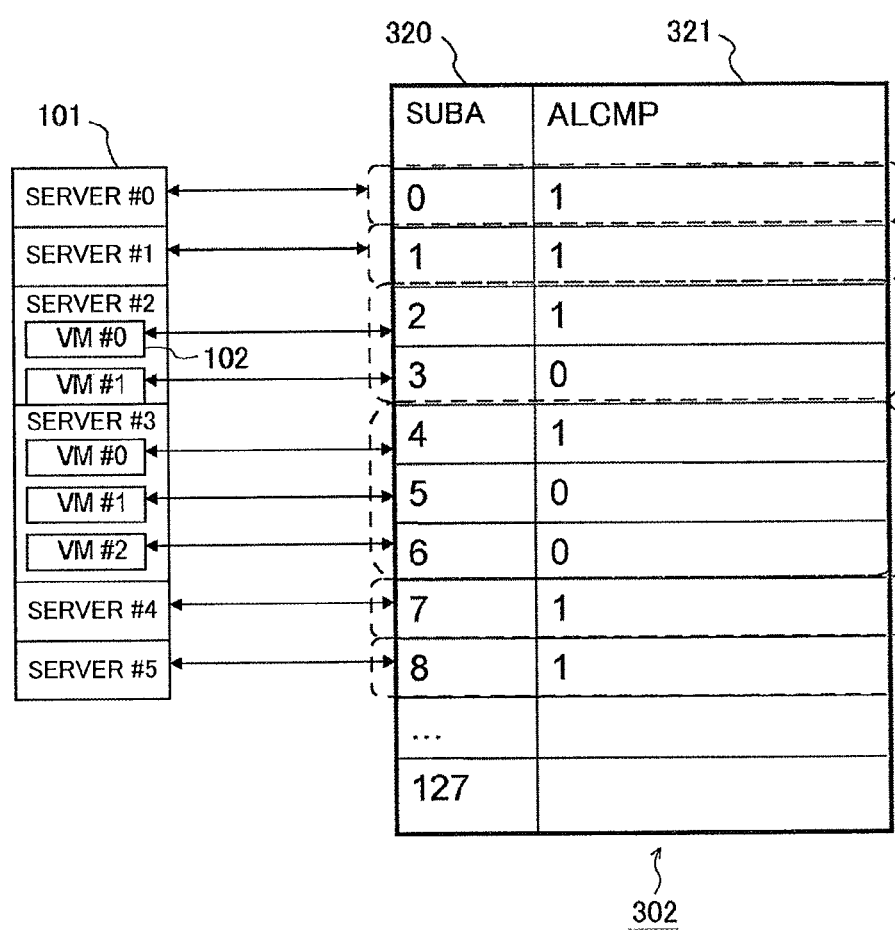
FIG. 15 is a view of the generation of the sub address allocation map according to Example 2.

FIG. 14 shows the structure of the SUBA_ALCAMP 302. Further, FIG. 15 is a view showing the formation of the structure. In the SUBA_ALCMAP 302, SUB address (SUBA) is recorded in a SUBA field 320. In an ALCMP field 321, "1" is recorded if the SUBA is the smallest of the SUBA allocated to a certain server, otherwise "0" is recorded. For example, if three virtual machines are running on a server #3, three SUB addresses of SUB addresses 4 to 6 are allocated to the server #3. Then, the smallest SUBA of the three SUBAs is "4", so that "1" is recorded in the fourth position of the ALCMP field, and "0" is recorded in the fifth and sixth positions of the ALCMP field.

The virtual machine identifier is used starting from 0. Thus, the range of the SUBA allocated to one server is from (SUBA for which "1" is recorded in SUBA_ALCMAP) to (SUBA−1 for which "1" is recorded in the next SUBA_ALCMAP). By using this property, it is possible to prevent the NIC logic from misidentifying the server as the source of the TLP.

FIG. 13 is a flow chart of the process of checking the access right by the NIC logic. When the TLP arrives at the NIC logic 130 (S1500), the NIC logic 130 calculates a SUBA (S1501). In other words, the NIC logic 130 checks if the virtual machine identifier is "0". If the virtual machine identifier is "0", the NIC logic 130 is going to access the smallest of the SUBAs allocated to the server that outputs the TLP. At least one SUBA is allocated to each server, and the NIC logic 130 can access the particular SURA. Thus, the NIC logic 130 proceeds to S1504, or otherwise, proceeds to S1503.

In S1503, the NIC logic 130 checks if the virtual machine identifiers are all "0" in the range from SUBA_ALCMP[EVH+1] to SUBA_ALCMP[SUBA]. If all the virtual machine identifiers are not "0", the SUBA is larger than the SUBA allocated to the server. Thus, the access to the particular SUBA is not possible. Then, the NIC logic 130 proceeds to S1505. If all the virtual machine identifiers are "0", the access to the particular SUBA is possible. Then, the NIC logic 130 proceeds to S1504.

Next, the method of broadcasting on Ethernet will be described.

FIG. 16 shows VLAN_MAP 303. The VLAN_MAP 303 is a list showing the VLAM to which each SUBA belongs. The SUBA field 331 is set for the VLAN field 303, where "1" is recorded in the part of SUBA belonging to VLAN. A SUBA is uniquely allocated to each server or virtual machine. Thus, the VLAN_MAP 303 shows which server or virtual machine belongs to which VLAN.

FIG. 17 shows a broadcast routing table 304. The broadcast routing table 304 shows the port to which a broadcast TLP is transferred according to the NIC logic which is the source of the TLP. An NUA field 340 is a field where the NUA of the source NIC logic of the broadcast TLP is recorded. In a port# field 341, when a TLP from an NUA is input, "1" is recorded in the part of the port of the PCIe switch to which the TLP should be transferred, and "0" is recorded in the part of the port of the switch to which the TLP should not be transferred.

Next, the process of transferring broadcast packets between servers will be described.

<Transmission Process>

The process in the transmission-side server is the same as the process shown in FIG. 5.

Figure 18:
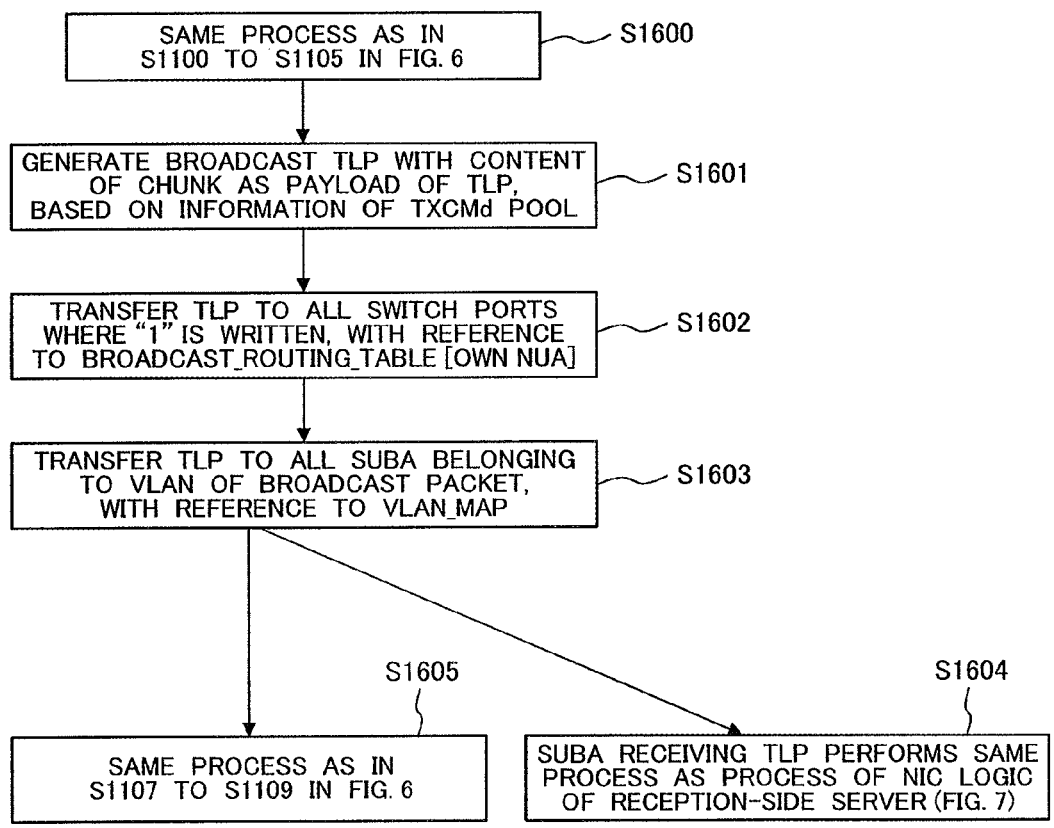
FIG. 18 is a flow chart of the process in the broadcast of the NIC logic in the transmission-side server according to Example 2.

FIG. 18 shows the process of the NIC logic of the transmission-side server. In S1600, the NIC logic performs the same process as in S1100 to S1105 in FIG. 6. The NIC logic obtains the information of a chunk on the memory of the server, based on the information of the TX descriptor.

In S1601, the NIC logic generates a TLP for broadcast with the content of the chunk as the payload, based on the information of the TX descriptor. In S1602, the NIC logic refers to the entry of [own NUA] of the Broadcast_Routing_Table 304. The TLP should be transferred to the port with "1" recorded in the port# field 341, so that the NIC logic transfers the TLP generated in S1601 to the corresponding port. Note that if "1" is not recorded in any part of the port# field 341, the NIC logic does not transfer the TLP.

Then, in S1603, the NIC logic refers to the VLAN_Map 303 and transfers the TLP generated in S1601 to every SUBA belonging to the VLAN to which the broadcast packet belongs. In S1604, the SUBA receiving the TLP performs the same process as the process shown in FIG. 7 to receive the TLP. Further, in S1605, the NIC logic performs the same process as in S1107 to S1109 shown in FIG. 6 to obtain the remaining chunks or end the transmission process.

<Reception/Transfer Process>

Figure 19:
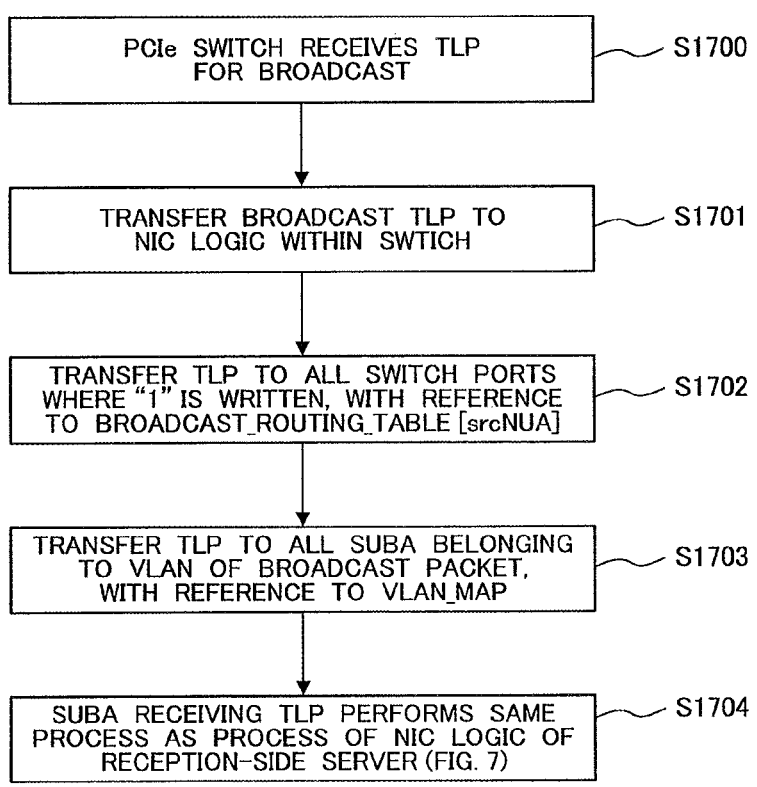
FIG. 19 is a flow chart of the process in the broadcast of the PCIe switch/virtual NIC in the reception-side server according to Example 2.

FIG. 19 shows the process of the NIC logic in the reception-side server.

When the PCIe switch 101 of the reception-side server receives a broadcast TLP (S1700), the PCIe switch transfers the broadcast TLP to the NIC logic 130 within the switch (S1701). If the TLP is for unicast, the PCIe switch 101 checks the destination SPA and transfers the unicast TLP. However, if the TLP is for broadcast, the PCIe switch 101 unconditionally transfers the broadcast TLP to the NIC logic 130 within the PCIe switch.

In S1702, the NIC logic 130 refers to the entry of [srcNUA] of the broadcast routing table 304. Here, the srcNUA means that the TLP should be transferred to the port with "1" recorded as the NUA of the source NIC logic of the broadcast TLP. Thus, the NIC logic 130 transfers the input TLP to each port.

Then, in S1703, the NIC logic 130 refers to the VLAN_Map 303 and transfers the input TLP to every SUBA belonging to the VLAN to which the broadcast packet belongs. Each SUBA receiving the TLP performs the same process as the process shown in FIG. 7 to receive the TLP (S1704).

REFERENCE SIGNS LIST

100 . . . Computer system
101 . . . Server
102 . . . PCIe link
103 . . . PCIe switch
104 . . . PCIe device
105 . . . System port address (SPA)
110 . . . CPU
111 . . . Memory
112 . . . Chip set
120 . . . External port
121 . . . Internal port
130 . . . NIC logic
200 . . . Unicast TLP
202 . . . Broadcast TLP
210 . . . Broadcast bit
211 . . . VLAN# field
212 . . . destSUBA field
213 . . . destNUA field
214 . . . srcNUA field
300 . . . SPA range register
301 . . . Bus#-SPA conversion table
302 . . . Sub Address Allocation Map
303 . . . VLAN Map
304 . . . Broadcast Routing Table
400 . . . TX Descriptor Get Pointer
401 . . . Transmission TLP header replacement part
402 . . . TX Command Pool
410 . . . Reception TLP header replacement part
411 . . . RX Key Table
500 . . . Copy of TX Descriptor Get Pointer
501 . . . TX Descriptor Put Pointer
502 . . . TX Descriptor Table
510 . . . Normal reception buffer
511 . . . Overflow reception buffer
512 . . . Chunk
513 . . . NW driver
521 . . . DestSPA field
522 . . . Frame Length field
523 . . . Chunk information field

The invention claimed is:

1. A computer system comprising:
a plurality of computers, each computer having at least a processor and associated memory, executing programs under an operating system (OS), and,
a first Peripheral Component Interconnect express (PCIe) switch, which is connected to each of the plurality of computers, to communicate packets between the computers through the first PCIe switch,
the first PCIe switch including:
an external port to which the computer is connected;
an internal port to which a second PCIe switch is connected; and
a first network interface card (NIC) logic to be recognized as an endpoint by the computer,
wherein a unique system port address (SPA) associated with the destination bus number is allocated to the external port and the first NIC logic,
wherein a first computer on the transmission side includes a first NW driver to be recognized as a driver of the NIC by the OS,
wherein the first NW driver stores data to be transmitted and a destination SPA into a memory, and outputs a transaction layer packet (TLP) generated by the first computer to the second PCIe switch,
wherein in the first PCIe switch, the first NIC logic adds the unique SPA to the TLP transferred from the first computer, and transfers data read from the memory to a second NIC logic having the destination SPA indicated by the unique SPA, and
wherein the second NIC logic receives the data, and writes the received data into a memory of a second computer on the reception side that is connected to the second PCIe switch where the second NIC logic exists, wherein the first NIC logic issues a read TLP to divide and obtain data of the packet stored in the memory of the first computer, and transmits in sequence the obtained data to the second NIC logic, wherein the second NIC logic transmits the received data to the second computer connected to the second PCIe switch in the order of reception, wherein the memory of the second computer includes:
a plurality of first reception buffers for each network packet, where the first NW driver can write and read data; and
a second reception buffer that can store data of every network packet, wherein the second computer writes the received data into one or more of the plurality of first reception buffers or the second reception buffer in the order of reception, and wherein the first NW driver reconstructs the data stored in the one or more first reception buffers or the second reception buffer into a network packet in the order of arrival time, wherein the first NW driver of the first computer generates information of the destination SPA added to the TLP to indicate a destination to which the packet is transferred, a frame length indicating the frame length of the packet, a length of each chunk which is the unit into which the packet information is divided, and a list of the addresses of the chunks, wherein the memory of the first computer stores the generated information of the destination SPA, the packet frame length, the length of each of the chunks, and the list of the addresses of the chunks, wherein in the first PCIe switch, the each port and the NIC logic have a register range for storing the range of the destination SPA of TLP that can pass through the external port from the inside of the first PCIe switch to the outside, and wherein the first NIC logic of the first PCIe switch reads each of the chunks stored in the memory, performs routing using the unique SPA by referring to the range register within the network of the PCIe switch, and transmits the each chunk to the second NIC logic corresponding to the second computer determined from the list of the addresses of the chunks.

2. The computer system according to claim 1,
wherein the first NIC logic of the first PCIe switch accumulates the length of the plurality of chunks read from the memory, and
wherein when the accumulated value is the same as the entire length of the frame of the packet to be transmitted which is stored in advance in the memory, the first NIC logic determines that all the chunks to be transmitted have been read.

3. The computer system according to claim 1,
wherein the first NIC logic of the first PCIe switch on the transmission side replaces the header of the TLP of the data of the chunk read from the memory of the first computer with a TLP header addressed to the reception-side TLP, and transmits the TLP to the unique SPA of the second NIC logic corresponding to the second computer.

4. The computer system according to claim 1,
wherein the second NIC logic of the second PCIe switch on the reception side stores the received frame into the second reception buffer, while replacing the data of a plurality of received chunks with a write request addressed to the address of the second reception buffer, to transmit the TLP, and
wherein in response to the interruption of the second NIC logic, a second NW driver of the second computer rearranges the data stored in the second reception buffer in the order of address to restore the packet.

5. A computer system comprising:
a plurality of computers that may include a virtual computer having processors to execute programs under an operating system (OS), and,
one or more Peripheral Component Interconnect express (PCIe) switches based on the PCI Express standard, a first PCIe switch being connected to each of the plurality of computers through a PCIe link, the PCIe switches being connected to each other through the PCIe link, to communicate packets between the computers through the PCIe switches,
wherein each of the PCIe switches includes a network interface card (NIC) logic to be recognized as an endpoint by the computer,
wherein a port of the first PCIe switch connected to the computer includes a conversion table where an endpoint Virtual Hierarchy (EVH), which is a number allocated, without duplication, to a computer with which a first NIC logic communicates, can be subtracted from the destination bus number,
wherein EVH obtained by referring to the conversion table is added to a transaction layer packet (TLP) that is input to the first PCIe switch from the computer,
wherein, for one or more of the plurality of computers, a memory of the computer includes an NW driver to be recognized as a driver of NIC by the OS,
wherein the NW driver writes transmission data and a destination SPA into the memory,
wherein the first NIC logic corresponding to a first computer on the transmission side reads the data and the destination SPA that are written in the memory by the NW driver,
wherein the first NIC logic transmits the data read from the memory to a second NIC logic having the destination SPA, and
wherein the second NIC logic receives the data and writes the received data into a memory of a second computer on the reception side, which is connected to a second PCIe switch where the second NIC logic exists.

6. The computer system according to claim 5,
wherein the first NIC logic includes a conversion table where Sub address (SUBA), which is the number allocated to the plurality of computers or virtual computers connected to the first PCIe switch without duplication, can be subtracted from the sum of the EVH and a part of the field existing in the TLP from the beginning, and
wherein according to the TLP input to the first NIC logic, the computer to output the TLP is determined.

7. The computer system according to claim 6,
wherein the first NIC logic includes a table for managing VLAN (Virtual LAN) to which each SUBA belongs, and a table for managing which port of the first PCIe switch is connected to the second PCIe switch having a SUBA to which each VLAN belongs, and
wherein when a broadcast packet is input, the first NIC logic refers to the table to copy only the TLP for the SUBA belonging to the same VLAN, and transmits the copy to transfer the broadcast packet only to the computer belonging to the same VLAN.

8. The computer system according to claim 6,
wherein the first NIC logic includes a table for managing the smallest one of the SUBAs that are allocated to the same computer,
wherein when the TLP is input to the first NIC logic, the first NIC logic determines that there is no SUBA recorded in the table between (the EVH+1) and (the EVH+the field), and
wherein the first NIC logic detects that the same computer is going to transmit the network packet to the SUBA that is not allocated to the same computer.

9. A data transmission method in a computer system comprising a plurality of computers having processors executing programs under an operating system (OS), and a first Peripheral Component Interconnect express (PCIe) switch based on the PCI Express standard, which is connected to each of the plurality of computers, the first PCIe switch being connected to the computer through an external port and also connected to a second PCIe switch through an internal port, to communicate packets between the computers through the first PCIe switch,
wherein a unique system port address (SPA) of the first PCIe switch, which is associated with a destination bus number, is allocated to a first virtual network interface card (NIC) logic to be recognized as an endpoint by one or more of the plurality of computers, and to the external port,
wherein in a first computer on the transmission side, a first NW driver, which is recognized as a driver of the first (NIC) by the OS of the first computer, stores data to be transmitted as well as the destination SPA into a memory while outputting a transaction layer packet (TLP) generated in the first computer to the first PCIe switch,
wherein the first NIC logic of the first PCIe switch corresponding to the first computer on the transmission side, adds the unique SPA to the TLP transferred from the first computer, and transfers the data read from the memory to second NIC logic having the destination SPA indicated by the unique SPA, and
wherein the second NIC logic receives the data and writes the received data into a memory of a second computer on the reception side connected to the a second PCIe switch where the second NIC logic exists,
wherein the first NIC logic issues a read TLP to divide and obtain data of the packet stored in the memory of the first computer, and transmits in sequence the obtained data to the second NIC logic,
wherein the second NIC logic transmits the received data to the second computer connected to the second PCIe switch in the order of reception,
wherein the memory of the second computer includes:
a plurality of first reception buffers for each network packet, where the first NW driver can write and read data; and
a second reception buffer that can store data of every network packet,
wherein the second computer writes the received data into one or more of the first reception buffers or the second reception buffer in the order of reception, and
wherein the first NW driver reconstructs the data stored in the one or more first reception buffers or the second reception buffer into a network packet in the order of arrival time.

10. The data transmission method according to claim 9,
wherein the first NW driver of the first computer generates information of a destination SPA added to the TLP to indicate a destination to which the packet is transferred, a frame length indicating the frame length of the packet, a length of each chunk which is the unit into which the packet information is divided, and a list of the addresses of the chunks,
wherein the memory of the first computer stores the generated information of the destination SPA, the packet frame length, the length of each of the chunks, and the list of the addresses of the chunks,
wherein in the first PCIe switch, the each port and the first NIC logic have a register range for storing the range of the destination SPA of TLP that can pass through the external port from the inside of the first PCIe switch to the outside, and
wherein the first NIC logic of the first PCIe switch reads each of the chunks stored in the memory, performs routing using the unique SPA by referring to the range register within the network of the first PCIe switch, and transmits the each chunk to the second NIC logic corresponding to the second computer determined from the list of the addresses of the chunks.

11. The data transmission method according to claim 10,
wherein the first NIC logic of the first PCIe switch accumulates the length of the plurality of chunks read from the memory, and
wherein when the accumulated value is the same as the entire length of the frame of the packet to be transmitted which is stored in advance in the memory, the first NIC logic determines that all the chunks to be transmitted have been read.

12. The data transmission method according to claim 10,
wherein the first NIC logic of the first PCIe switch on the transmission side replaces the header of the TLP of the data of the chunk read from the memory of the first computer with a TLP header addressed to the reception-side TLP, and transmits the TLP to the unique SPA of the second NIC logic corresponding to the second computer.

13. The data transmission method according to claim 10,
wherein the second NIC logic of the second PCIe switch on the reception side stores the received frame into the second reception buffer, while replacing the data of a plurality of received chunks with a write request addressed to the address of the second reception buffer, to transmit the TLP, and
wherein in response to the interruption of the first NIC logic, a second NW driver of the second computer rearranges the data stored in the second reception buffer in the order of address to restore the packet.

* * * * *